D. H. HATLEE.
SPEED REDUCER.
APPLICATION FILED FEB. 26, 1920.

1,365,492.

Patented Jan. 11, 1921.
2 SHEETS—SHEET 1.

Inventor
David H. Hatlee

By Franklin H. Hough
Attorney

D. H. HATLEE.
SPEED REDUCER.
APPLICATION FILED FEB. 26, 1920.
1,365,492.
Patented Jan. 11, 1921.
2 SHEETS—SHEET 2.
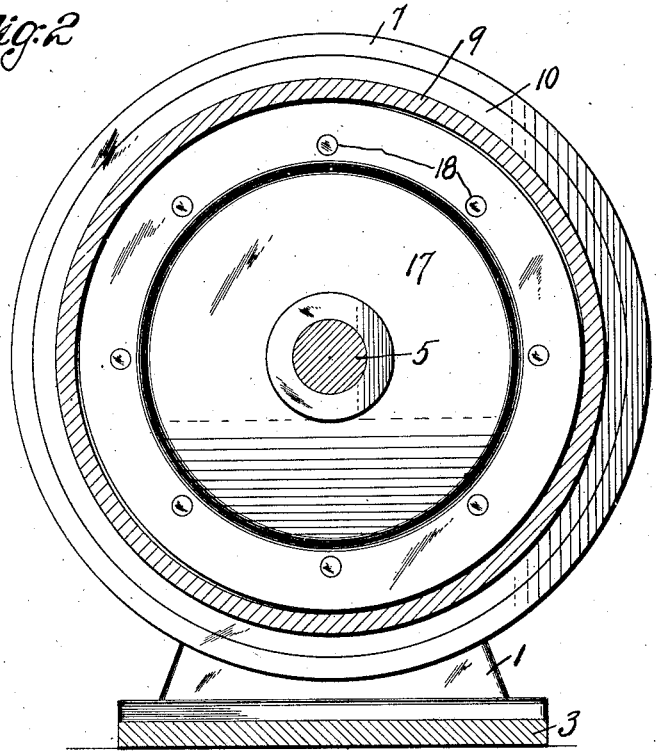
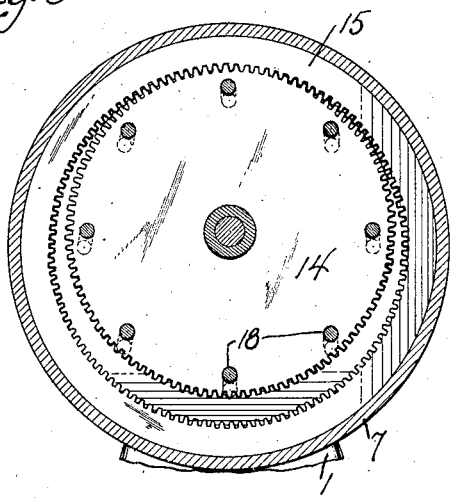
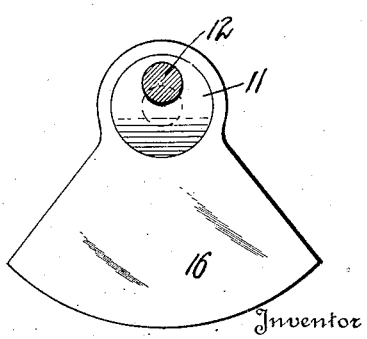
Inventor
David H. Hatlee
By Franklin H. Hough
Attorney

UNITED STATES PATENT OFFICE.

DAVID H. HATLEE, OF WATERVLIET, NEW YORK.

SPEED-REDUCER.

1,365,492.   Specification of Letters Patent.   Patented Jan. 11, 1921.

Application filed February 26, 1920. Serial No. 361,483.

*To all whom it may concern:*

Be it known that I, DAVID H. HATLEE, a citizen of the United States, residing at Watervliet, in the county of Albany and State of New York, have invented certain new and useful Improvements in Speed-Reducers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel speed reducer, interposed between a driving and a driven shaft, whereby the speed of revolution of the driven shaft is much less than that of the driving shaft.

A further object is to provide a speed reducing mechanism which shall be very simple in construction and thoroughly practical from a manufacturing standpoint.

The invention is clearly disclosed in an exemplary form in the accompanying drawings, in which like reference characters designate corresponding parts throughout the several views.

Briefly described:

Fig. 2 is a section on the line 2, 2 of Fig. 1.

Fig. 3 is a section on the line 3, 3 of Fig. 1.

Fig. 4 is a detached detail view of the counterbalance.

Figure 1:
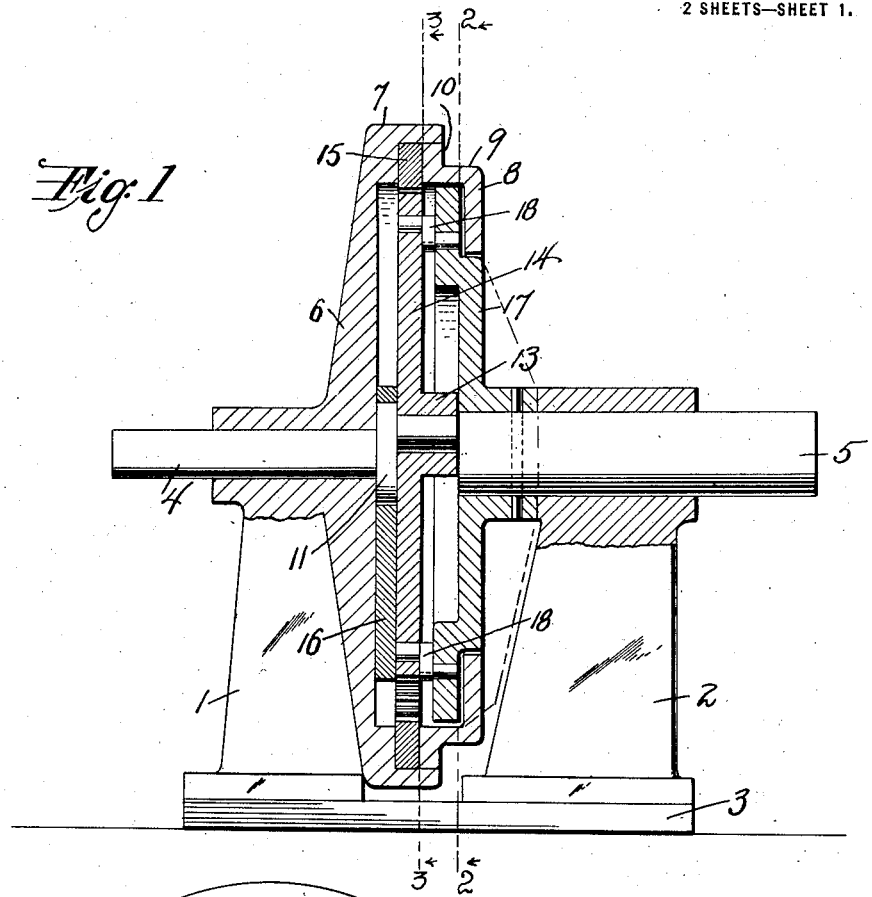
Figure 1 is a view in side elevation, partly in section, of the speed reducing mechanism.
Figure 5:
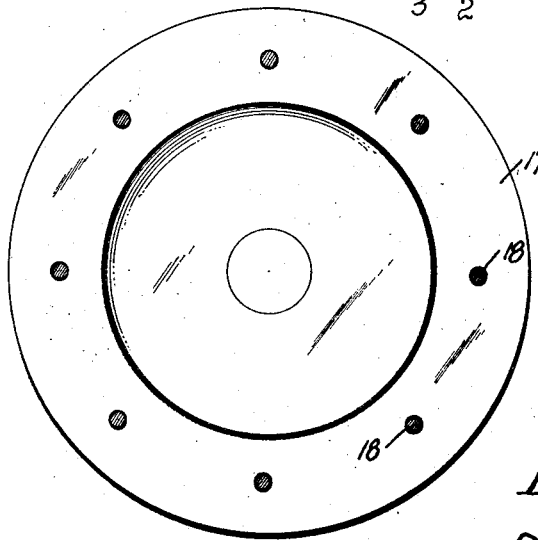
Fig. 5 is a detached detail view of the disk on the driven shaft.

Referring now in detail to the drawings:

1 and 2 designate standards rising from a base 3, said standards rotatably supporting a driving shaft 4 and a driven shaft 5 respectively.

The standard 1 carries a housing 6, provided with a circumferential flange 7, to which is detachably secured a guard member 8, which, as shown, is in the form of a ring, provided with a circumferential flange 9, having an angled terminal 10 bearing against the inner surface of the flange 7.

The shaft 4 is a crank shaft and is provided at one end with a concentric disk 11, carrying an eccentric pin 12, passing through the head 13 of a gear 14, meshing with a stationary gear ring 15, secured to the flange 7.

The flange 7 is concentric with the shaft 4 and the gear 15 is also concentric with the shaft 4, and the gear 14 eccentric to said shaft 4. The gear 14 is of lesser diameter than the gear 15 and has a lesser number of teeth. By reason of the eccentricity of the gear 14 and by reason of the lesser diameter thereof, a portion only of the gear 14 meshes with the gear 15 at any one time.

Supported on the disk 11 is a counterbalance 16, which, as shown, is formed in the shape of a sector.

Keyed to the driven shaft 5 is a disk 17, the portion thereof toward the margin being disposed in proximity with the rear face of the guard 8, as shown in Fig. 1. Connecting the gear 14 and the disk 17 is an annular series of cranks, or links, 18, as clearly shown in Fig. 1.

The operation is as follows:

Rotation being imparted to the driving shaft 4, the gear 14, being in mesh with the stationary gear 15, turns backward and such motion is imparted to the disk 17, and consequently, to the driven shaft 5, which, by the construction described, is driven with greatly less speed than the crank shaft 4.

It will be noted by the construction described that the shaft 5 is concentric with the shaft 4 and that the disk 17 is also concentric with said shafts.

What I claim to be new is:

1. A transmission mechanism employing concentric driving and driven shafts, a rigid housing embracing the driving shaft and having an inwardly turned annular flange, a gear mounted rigidly in the housing, a second gear mounted in engagement with the first-mentioned gear and eccentric thereto, a disk carried rigidly upon the driven shaft and having a flange contained within and with an annular rabbet accommodating the inturned annular flange, and crank connectors connecting the eccentric gear with the disk.

2. A transmission mechanism comprising concentric driving and driven shafts, a housing embracing the driving shaft and having an inturned annular flange, a disk carried rigidly upon the driven shaft and having a flange within and co-acting with the inturned annular flange and provided with an inset space, an internal gear mounted rigidly within and about the housing, and a smaller gear carried eccentrically upon the driving shaft having a boss movable within the inset of the disk and in engagement with the rigid gear, and crank connectors connecting the eccentric gear and the disk.

In testimony whereof I hereunto affix my signature.

DAVID H. HATLEE.